(12) United States Patent
Gotou et al.

(10) Patent No.: US 7,660,021 B2
(45) Date of Patent: Feb. 9, 2010

(54) FACSIMILE MACHINE

(75) Inventors: Kazunori Gotou, Osaka (JP); Shinya Ogawa, Osaka (JP); Daisaku Nagano, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 251 days.

(21) Appl. No.: 11/998,201

(22) Filed: Nov. 29, 2007

(65) Prior Publication Data

US 2008/0130060 A1    Jun. 5, 2008

(30) Foreign Application Priority Data

Nov. 30, 2006  (JP) .............................. 2006-322837
Dec. 20, 2006  (JP) .............................. 2006-343492

(51) Int. Cl.
*H04N 1/40* (2006.01)
*H04N 1/00* (2006.01)
*G06F 3/12* (2006.01)
*G06K 15/00* (2006.01)

(52) U.S. Cl. .................. 358/3.28; 358/1.15; 358/1.16; 358/402; 358/407

(58) Field of Classification Search ............... 358/3.28, 358/1.15, 1.16, 402, 407
See application file for complete search history.

(56) References Cited

U.S. PATENT DOCUMENTS

| 7,193,518 | B2 * | 3/2007 | Kiwada et al. ........... 340/572.1 |
| 7,327,259 | B2 * | 2/2008 | Kim et al. ................ 340/572.1 |
| 2006/0132816 | A1 * | 6/2006 | Yamamoto et al. ......... 358/1.13 |

FOREIGN PATENT DOCUMENTS

JP    8-279866    10/1996
JP    9-69908     3/1997

* cited by examiner

*Primary Examiner*—Edward L Coles
*Assistant Examiner*—Charlotte M Baker
(74) *Attorney, Agent, or Firm*—Jordan and Hamburg LLP (57) ABSTRACT

A facsimile machine according to the present invention is capable of accurately comprehending management information of a received document such as from which source to which destination a received document on a discharge tray has been sent, when and by whom a part or the whole has been taken away, since a received document managing section 37 manages the received facsimile document based on a placement status obtained by a placement status obtaining section 27 and stored information of a reception information storing section 31. Consequently, the received facsimile document which has been sent from a source to a destination can be managed properly based on the management information.

14 Claims, 5 Drawing Sheets

Fig.3A

Table of Reception Information Records

| Serial Number | Date and Time | Source User Name | Destination User Name | Communication Result | Receipt Acknowledgement | The Number of Pages |
|---|---|---|---|---|---|---|
| 01 | 1006.09.20 11:20 | ABC Co., Ltd. FUKUOKA Taro | Third Design Division OSAKA Hanako | OK | Completed | 5 |
| 02 | 1006.09.20 12:30 | BCD Commercial Co. NAGASAKI Jiro | Second Design Division TOKYO Jiro | OK | Completed | 7 |
| 03 | 1006.09.20 13:33 | EFG Co., Ltd. KOBE Hanako | First Design Division OSAKA Taro | OK | Not Completed | 3 |
| ... | ... | ... | ... | ... | ... | ... |

Fig.3B

Table of Page Information Records

| Serial Number | Recording Paper ID | Output Paper Size | Resolution | Communication Result | Removal Date and Time | Removal User Name |
|---|---|---|---|---|---|---|
| 01 | 123456_001 | A4 | Normal | OK | — | — |
| 02 | 123456_002 | B4 | Fine | OK | — | — |
| 03 | 123456_003 | A3 | Super_Fine | OK | — | — |

Fig.4

FACSIMILE MACHINE

BACKGROUND OF THE INVENTION

1. Field of the Invention

This invention relates to a facsimile machine capable of properly managing a received facsimile document which has been sent from a source to a destination.

2. Background Art

There has been a demand in conventional facsimile machines that a source wants to confirm receipt of the received document the source has sent to a destination. To satisfy the demand, it is important that the received facsimile document which has been sent from the source to the destination is properly managed at the destination side.

In order to satisfy the demand that the source wants to confirm receipt of the received facsimile document, Japanese Published Unexamined Patent Application No. H8-279866 describes art wherein a receipt message to the effect that document information has been received is transmitted to the source when a document sensor provided on an output tray section detects no paper within the output tray section.

Japanese Published Unexamined Patent Application No. H9-69908 describes that a paper output sensor detecting whether a received document having been output on a paper output tray is placed on the paper output tray and a voice data controlling section 13 informing the source by telephonic communication that the received document has been received when the paper output sensor detects that the received document has been taken away are provided, and thus the source can reliably confirm that the received document has been received by the destination and also the destination can reliably recognize that the received document has arrived.

However, a user generally takes away only a received document addressed to himself/herself, for example, in a facsimile machine shared by a plurality of users among the foregoing conventional facsimile machines. As a result, when a received document addressed to a plurality of users is mixed and piled up on a discharge section, the received document addressed to the other users is left on the discharge section as it is. In this case, receipt of the received document cannot be confirmed properly by the facsimile machines in accordance with the conventional art. Therefore, it was difficult for the conventional facsimile machines to properly manage the received facsimile document which has been sent from the source to the destination.

SUMMARY OF THE INVENTION

Accordingly, it is an object of the present invention to provide a facsimile machine capable of properly managing a received facsimile document which has been sent from a source to a destination.

In order to achieve the foregoing object, a facsimile machine according to the present invention includes an image forming section forming an image of a facsimile document which has been received from a source on a sheet of recording paper, a discharge section on which the received document image-formed by the image forming section is discharged, a reception information storing section storing reception information of the received document, every time a facsimile is received from the source, as associating with recording paper identification information which is stored on a non-contact type memory provided on a plurality of respective sheets of the recording paper and is capable of identifying each sheet of the recording paper uniquely, a placement status obtaining section provided in the discharge section and obtaining a placement status of the received document in the discharge section by reading the recording paper identification information of the non-contact type memory and a received document managing section managing the received facsimile document based on the placement status obtained by the placement status obtaining section and stored information of the reception information storing section.

Further, the received document managing section can be configured to manage the received facsimile document regarding that a received document specified based on the placement status has been taken away when a determination that the placement status of the received document obtained by the placement status obtaining section shifts from presence to absence is made.

Still further, the received document managing section can be configured to manage the received facsimile document regarding that the whole of a received document included in the facsimile reception has been taken away when a determination that the placement status of the received document obtained by the placement status obtaining section shifts from presence to absence is made and also when the determination of the shifting is made about the whole of the received document included in the facsimile reception specified based on the placement status.

Still further, the received document managing section may be configured to manage the received facsimile document regarding that a received document included in the facsimile reception has been partly taken away when a determination that the placement status of the received document obtained by the placement status obtaining section shifts from presence to absence is made and also when the determination of the shifting is made about a part of the received document among the whole of the received documents included in the facsimile reception specified based on the placement status.

Furthermore, the received document managing section can be configured to manage the received facsimile document regarding that a received document specified based on the placement status is forgotten to be removed when a determination that the placement status of the received document obtained by the placement status obtaining section does not shift from presence to absence even after a predetermined time has elapsed is made.

On the other hand, a user identification information obtaining section obtaining user identification information of an access user every time the user makes access is further provided, and the received document managing section can be configured to manage the received facsimile document based on the placement status obtained by the placement status obtaining section, the stored information of the reception information storing section and the user identification information obtained by the user identification information obtaining section.

In this case, the received document managing section can be configured to manage the received facsimile document regarding that when a determination that the placement status of the received document obtained by the placement status obtaining section shifts from presence to absence is made, a received document specified based on the placement status has been taken away by a user specified based on the user identification information obtained by the user identification information obtaining section upon determination of the shifting.

Further, the received document managing section may be configured to manage the received facsimile document regarding that a received document specified based on the placement status has been taken away by a user of a proper destination when a determination that the placement status of the received document obtained by the placement status obtaining section shifts from presence to absence is made and also when a determination that a user specified based on the user identification information obtained by the user identification information obtaining section upon determination of the shifting agrees with a user of destination information base on the stored information of the reception information storing section is made.

In addition, the received document managing section may be configured to manage the received facsimile document regarding that a received document specified based on the placement status has been taken away by a user different from a proper destination when a determination that the placement status of the received document obtained by the placement status obtaining section shifts from presence to absence is made and also when a user specified based on the user identification information obtained by the user identification information obtaining section upon determination of the shifting does not agree with a user of the destination information based on the stored information of the reception information storing section is made.

Furthermore, the received document managing section may be configured to manage the received facsimile document regarding that a received document specified based on the placement status is forgotten to be removed by a user of the destination information based on the stored information of the reception information storing section when a determination that the placement status of the received document obtained by the placement status obtaining section does not shift from presence to absence even after a predetermined time has elapsed is made.

Further, the received document managing section can be configured to inform both or either of an appropriate source and/or an appropriate destination of management information of the received facsimile document.

In this case, the management information can be configured to be informed via facsimile or e-mail.

Further, the user identification information obtaining section can be configured to obtain user identification information which is stored on a non-contact type memory carried by a plurality of respective users and is capable of identifying each user uniquely, via the non-contact type memory every time the user makes access.

Alternatively, the user identification information obtaining section may be configured to obtain the user identification information through a key input operation by the user or biometric authentication of the user every time the user makes access.

[Operation and Effects of the Invention]

The facsimile machine according to the present invention includes an image forming section forming an image of a document which has been received from a source via facsimile on a sheet of recording paper, a discharge section on which the received document image-formed by the image forming section is discharged, a reception information storing section storing reception information of the received document, every time a facsimile is received from the source, as associating with recording paper identification information which is stored on a non-contact type memory provided on a plurality of respective sheets of the recording paper and capable of identifying each sheet of the recording paper uniquely, a placement status obtaining section provided in the discharge section and obtaining a placement status of the received document in the discharge section by reading the recording paper identification information of the non-contact type memory and a received document managing section as will be described next. The received document managing section manages the received facsimile document based on the placement status obtained by the placement status obtaining section and stored information of the reception information storing section. Here, 'to manage a received facsimile document' means comprehending accurately management information of the received document such as from which source to which destination the received document on the discharge tray has been sent, when and by whom a part or the whole has been taken away, etc., based on the placement status obtained by the placement status obtaining section and stored information of the reception information storing section, and also storing, changing, deleting or updating the comprehended management information of the received document so as to be used for informing a source or destination. Therefore, according to the facsimile machine according to the present invention, a received facsimile document which has been sent from a source to a destination can be managed properly based on the management information.

DESCRIPTION OF THE PREFERRED EMBODIMENTS

Hereinafter, a facsimile machine in accordance with an embodiment of the present invention is described in detail with reference to the drawings.

[General Configuration of a Facsimile Machine in Accordance with an Embodiment of the Present Invention]

Figure 1:
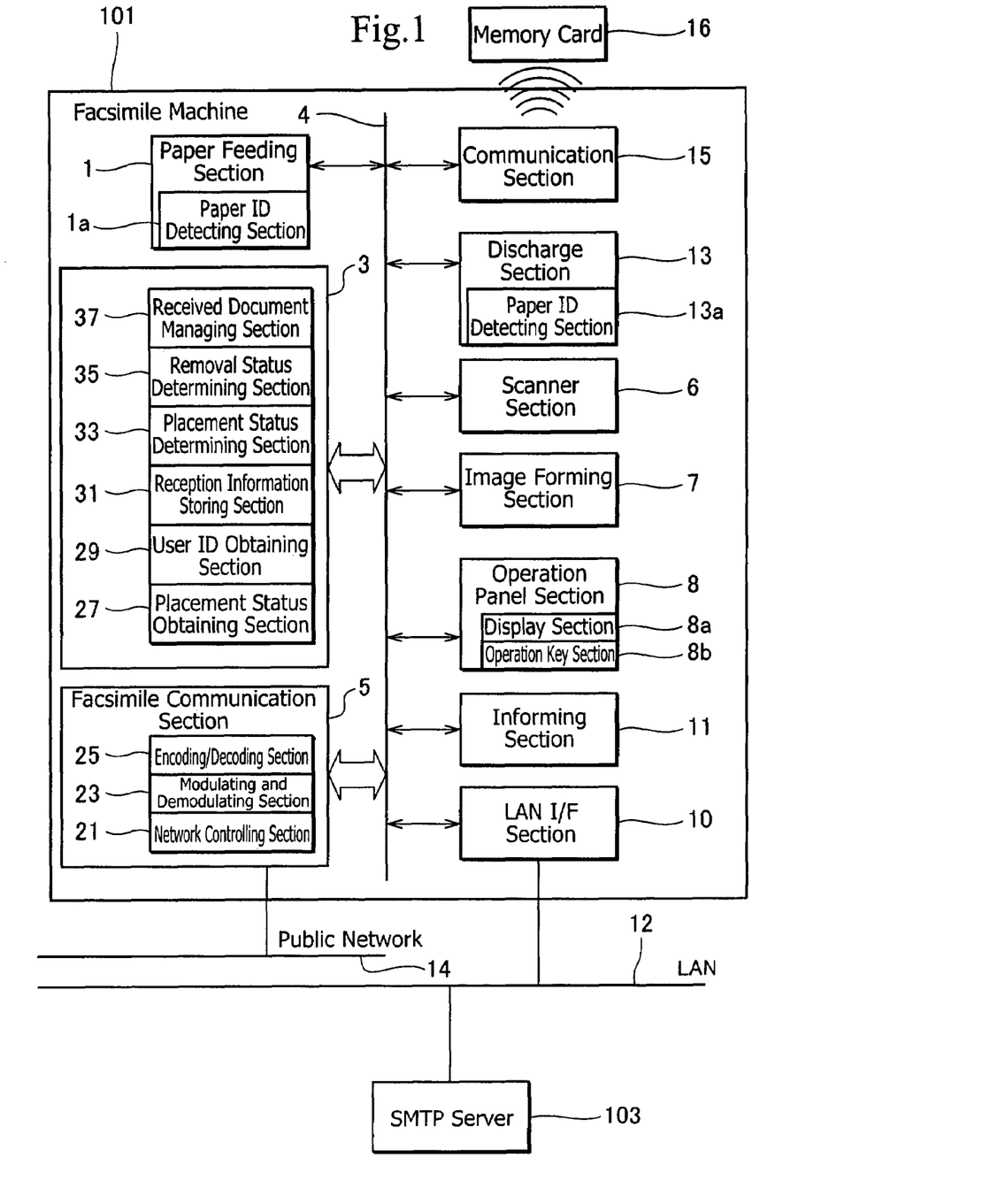
FIG. 1 is a block diagram showing an overview of a facsimile machine in accordance with an embodiment of the present invention.

As shown in FIG. 1, various functions including a copying job, a printing job or a network transmission (mail transmission, data transmission, etc.) job other than a facsimile communication job are available in a facsimile machine 101 according to the embodiment of the present invention. The facsimile machine 101 is controlled by a facsimile controller 3 composed of a microcomputer and dedicated hardware circuitry. As input/output devices connected to the facsimile controller 3 via a bus line 4 and taking charge of the various functions, the facsimile machine 101 is provided with a paper feeding section 1, a facsimile communication section 5, a scanner section 6, an image forming section 7, an operation panel section 8, a local area network interface (LAN I/F) section 10, an informing section 11, a discharge section 13 and a communication section 15. The facsimile machine 101 is connected with a simple mail transfer protocol (SMTP) server 103 via a local area network (LAN) 12 while connected to a public network 14.

The scanner section 6 includes an image irradiation lamp and a charge coupled device (CCD) sensor constituting a scanner (not shown). The image irradiation lamp irradiates a document and the CCD sensor receives its reflection, thereby reading out an image from the document and outputting image data corresponding to the read-out image to an image processing section (not shown).

The image forming section 7 includes a photoconductor drum, an exposure system and a development system, all of which are not shown. The image forming section 7 prints an image on a sheet of recording paper by using image data which has been read by the scanner section 6, image data which has been transmitted from a client personal computer (PC) by the LAN 12 via the LAN I/F section 10 and image data of facsimile data which has been received from an external facsimile machine by the facsimile communication section 5. In the embodiment, the image forming section 7 prints an image of a received facsimile document which has been received by the facsimile communication section 5 on a sheet of the recording paper.

The operation panel section 8 includes a display section 8a and an operation key section 8b, and is used when a user performs operations in connection with a facsimile function, a scanner function, a printer function, a copier function, etc.

The display section 8a is composed of a touch panel unit combined with a touch panel and a color liquid crystal display (LCD). The display section 8a displays various operation screens and also displays operation buttons for the user to input various operation commands by touching an appropriate place.

The operation key section 8b is provided with a plurality of operation keys to accept an operation input by the user. The operation key section 8a is used when the user selectively carries out a key input operation for a necessary function from among various functions such as the facsimile function, the copier function, the printer function and the scanner function, for example. More specifically, the operation key section 8a is used, for example, when the user performs a ten-key input operation to select a facsimile machine at the other end as using the facsimile function and when the user carries out an input operation for a one touch dial or a speed dial.

With the use of a network interface (10/100 Base-TX), the LAN I/F section 10 controls transmission and reception of various data with respect to a user terminal such as a client PC connected via the LAN 12. When an e-mail is transmitted/received, for example, the e-mail is transmitted/received to a sender or receiver via the LAN I/F section 10 and the SMTP server 103.

The informing section 11 has a function of informing both or either of an appropriate source and/or an appropriate destination of management information about the received facsimile document.

Figure 2:
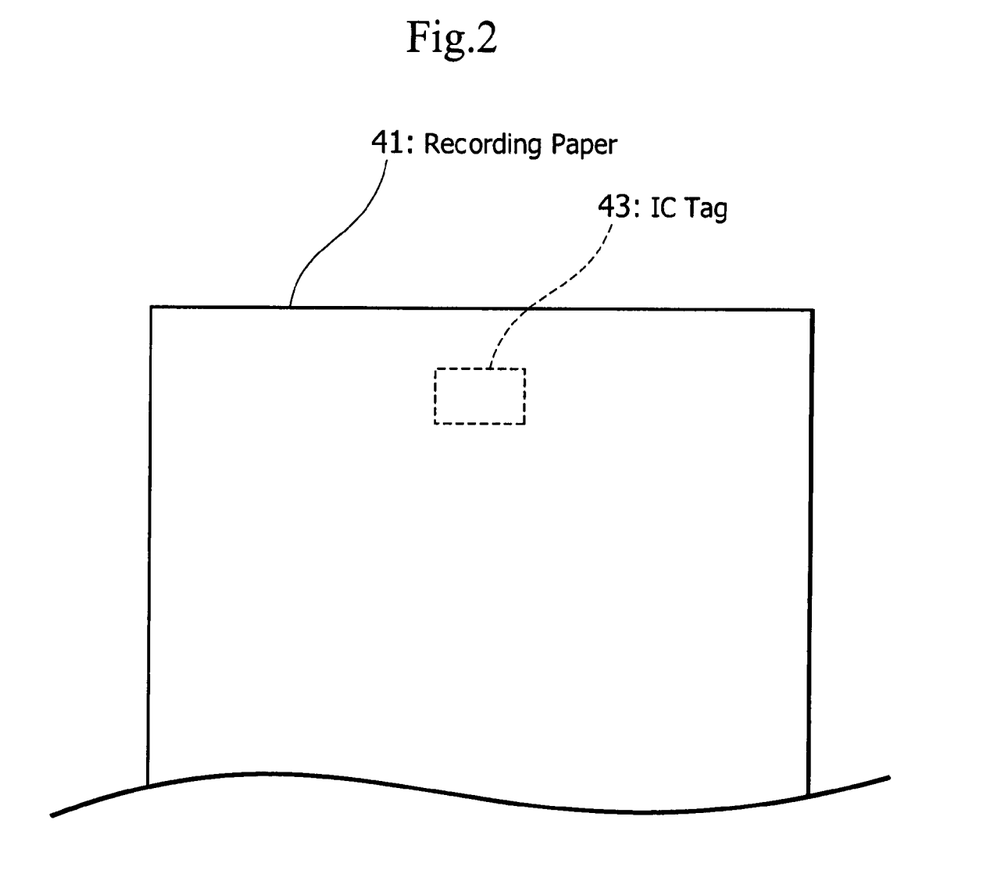
FIG. 2 is an explanatory diagram showing a state of an IC tag embedded in a sheet of recording paper used in the facsimile machine according to the embodiment of the present invention.

The paper feeding section 1 is a section to store recording paper before printing processing, and is provided with a paper ID detecting section 1a. The paper ID detecting section 1a has a function of reading out recording paper identification information which is stored in an IC tag 43 embedded in recording paper 41 and is capable of identifying a plurality of respective sheets of the recording paper uniquely when the printing processing is carried out, as shown in FIG. 2. As the IC tag 43, a non-contact type IC memory, for example, a μ-chip registered trademark by Hitachi, Ltd. can be used suitably.

The discharge section 13 includes a discharge tray for placing a received document of which printing processing has been finished, and is provided with a paper ID detecting section 13a. The paper ID detecting section 13a (corresponding to a part of 'a placement status obtaining section' in the present invention) is used at the time of obtaining a placement status with regard to how much of the received document of which printing processing has been finished is left on the discharge tray.

The communication section (corresponding to a part of 'a user identification information obtaining section' in the present invention) 15 has a function of obtaining user identification information about an access user approaching the machine 101 by performing wireless communication with a memory card 16 such as an IC card carried by the user.

The facsimile communication section 5 has a function of transmitting image data of a document which has been read by the scanner section 6 to a facsimile machine at the other end via the public network 14 and receiving image data which has been transmitted from a facsimile machine at the other end. The facsimile communication section 5 includes a network controlling section 21, a modulating and demodulating section 23 and an encoding/decoding section 25.

The network controlling section 21 corresponds to a network control unit (NCU), and has a function of performing network control such as sending a dial signal to the public network 14.

The modulating and demodulating section 23 has a function of modulating compressed/encoded image data to a voice signal and demodulating a received voice signal to image data.

The encoding/decoding section 25 has a function of compressing and encoding image data of a document targeted for communication and decompressing and decoding received image data.

In order to properly manage the whereabouts of the received facsimile document which has been sent from a source to a destination, the facsimile controller 3 includes a placement status obtaining section (cooperating with the paper ID detecting section 13a to serve as 'a placement status obtaining section' in the present invention) 27 provided in the discharge section 13 and obtaining a placement status of the received document on the discharge tray by reading out recording paper identification information (hereinafter sometimes abbreviated as 'recording paper ID') of the IC tag 43, a user identification information obtaining section (cooperating with the communication section 15 to serve as 'a user identification information obtaining section' in the present invention) 29 obtaining user identification information (hereinafter sometimes abbreviated as 'user ID') of an access user every time the user makes access, a reception information storing section (corresponding to 'a reception information storing section' in the present invention) 31 storing reception information of the received document, every time a facsimile is received from the source, as associating with the recording paper identification information of the non-contact type IC tag 43, a placement status determining section 33 making a determination whether the placement status of the received document obtained by the placement status obtaining section 27 shifts from presence to absence, a removal status determining section 35 making a determination whether the shifting is made with respect to the whole of the received document included in facsimile reception specified based on the relevant placement status and a received document managing section (corresponding to 'a received document managing section' in the present invention) 37 managing the received facsimile document based on the placement status obtained by the placement status obtaining section 27 and stored information of the reception information storing section 31. The functions taken charge of by the placement status determining section 33 and the removal status determining section 35 may be combined into the received document managing section 37.

[Exemplification of Reception Information]

Figure 3A:
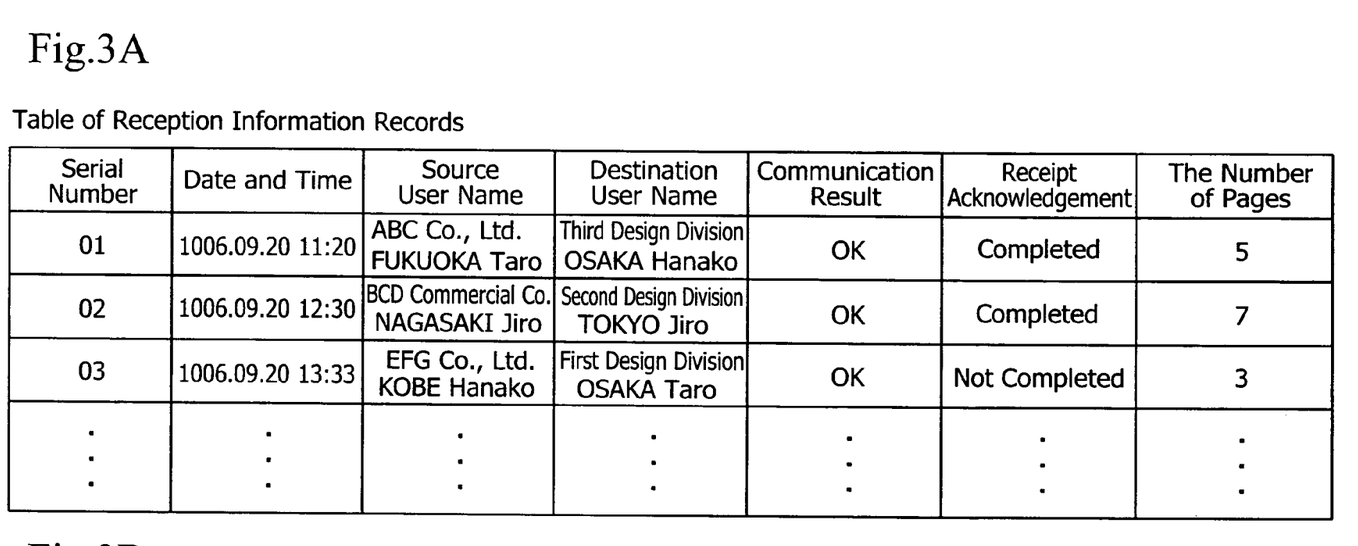
FIG. 3A is an explanatory diagram exemplifying details of reception information of a received document, stored as associated with recording paper identification information.

As attributes included in reception information stored in the reception information storing section 31 and serving an important role in the present invention, a serial number, a date and time of facsimile reception, information of a source user name, information of a destination user name, a communication result, a status whether receipt acknowledgement is notified, the number of pages of the facsimile reception can be exemplified, as shown in a table of reception information records of FIG. 3A. As attributes included in page information subordinate to the reception information of the serial number '03' among the reception information records in FIG. 3A, for example, a serial number for each page, a recording paper ID for each page ('123456_001', '123456_002' and '123456_003' in the embodiment), an output paper size for each page ('A4' size, 'B4' size, 'A3' size, etc.), resolution for each page ('Normal', 'Fine', 'Super_Fine', etc.), a communication result for each page, a removal date and time for each page ('-' in the embodiment means the page has not been taken away yet) and a removal user name for each page ('-' in the embodiment means the page has not been taken away yet) can be exemplified as shown in a table of page information records of FIG. 3B. The reception information is referred to, for example, when a placement status as to which and how much of the received document among received facsimile documents that have been discharged on the discharge tray is left after the printing processing is finished is obtained. This reception information can be obtained from a facsimile machine at the other end during facsimile communication by using a non-standard facilities set-up (NSS), for example. By Internet FAX, the reception information can be obtained by writing down on a header or main body of a mail message.

[Operations of a Facsimile Machine According to the Embodiment of the Present Invention]

Figure 4:
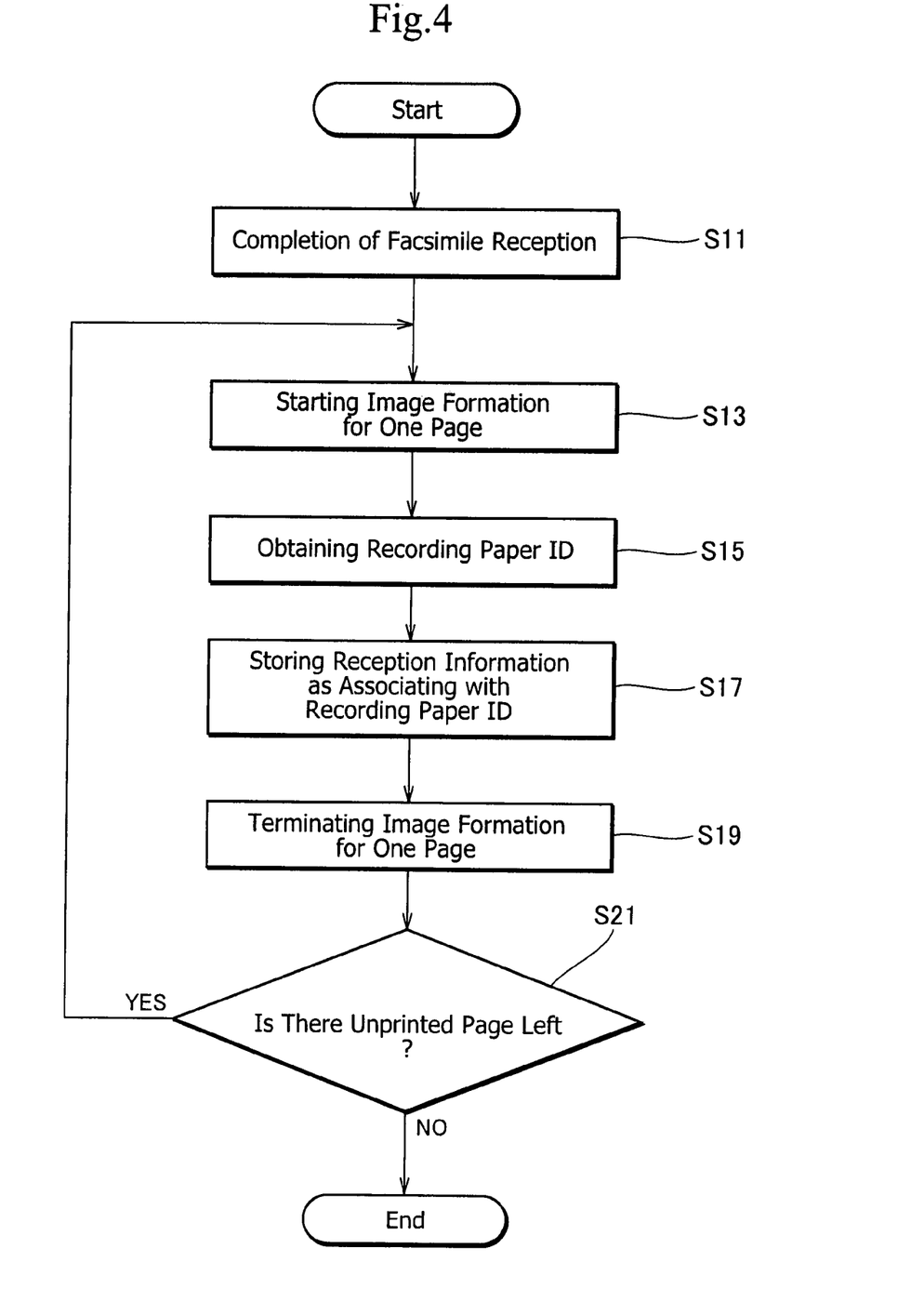
FIG. 4 is an operational flowchart to store the reception information as associating with the recording paper identification information of the received document when a document image is printed out on a sheet of the recording paper.

Now, a flow of an operation of associating reception information with recording paper ID at facsimile reception is explained according to a flowchart in FIG. 4.

The facsimile communication section 5 completes facsimile reception at Step S11. At this moment, image data of a document which has been received via facsimile is stored on an image memory (not shown).

At Step S13, the facsimile controller 13 starts an image forming processing on recording paper 41 for every page of an image of the received facsimile document from the source.

At Step S15, the paper ID detecting section 1a of the paper feeding section 1 reads out and detects recording paper ID of the IC tag 43 embedded in the recording paper 41 at the timing that the recording paper 41 stored in the paper feeding section 1 is sent out to the image forming section 7. The paper ID detecting section 1a then transmits the detected recording paper ID of the IC tag 43 to the facsimile controller 3. Although the embodiment is explained as giving an example that the IC tag 43 embedded in the recording paper 41 is provided in advance with the recording paper ID capable of identifying a plurality of sheets of recording paper uniquely, the present invention is not limited to the example. More specifically, for example, a writing section (not shown) for writing the recording paper ID of the IC tag 43 may be configured to be provided in the paper feeding section 1 and give the recording paper ID to the IC tag 43.

Figure 3B:
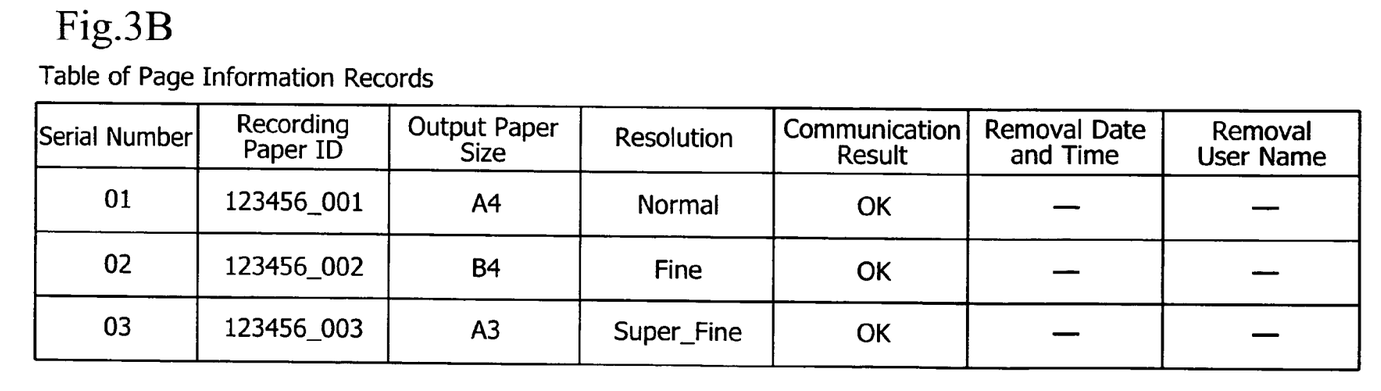
FIG. 3B is an explanatory diagram exemplifying details of page information subordinate to the reception information in FIG. 3A.

In response to the recording paper ID of the IC tag 43 which has been detected at Step S15, the reception information storing section 31 stores the recording paper ID of the IC tag 43 in a field of the recording paper ID among the attributes of the page information as shown in FIG. 3B at Step S17.

When the image forming processing for one page is completed at Step S19, the facsimile controller 3 makes a determination at Step S21 whether there is a page which has not been printed out yet among the received facsimile documents. As a result of the determination, the facsimile controller 3 moves the flow of the operation return to Step S13 and performs the subsequent operation sequentially when a determination that there is a page which has not been printed out yet is made. On the other hand, the facsimile controller 3 terminates a series of the flow of operations when a determination that all of the pages have finished being printed out is made.

By the foregoing series of operations, the recording paper ID of the IC tag 43 embedded in each sheet of the recording paper 41 is stored in the field of the recording paper ID in the table of the page information shown in FIG. 3B subordinate to the table of the reception information shown in FIG. 3A, as associated with the reception information of the facsimile reception, with respect to the recording paper 41 of each page on which the received facsimile document has been image-formed.

Figure 5:
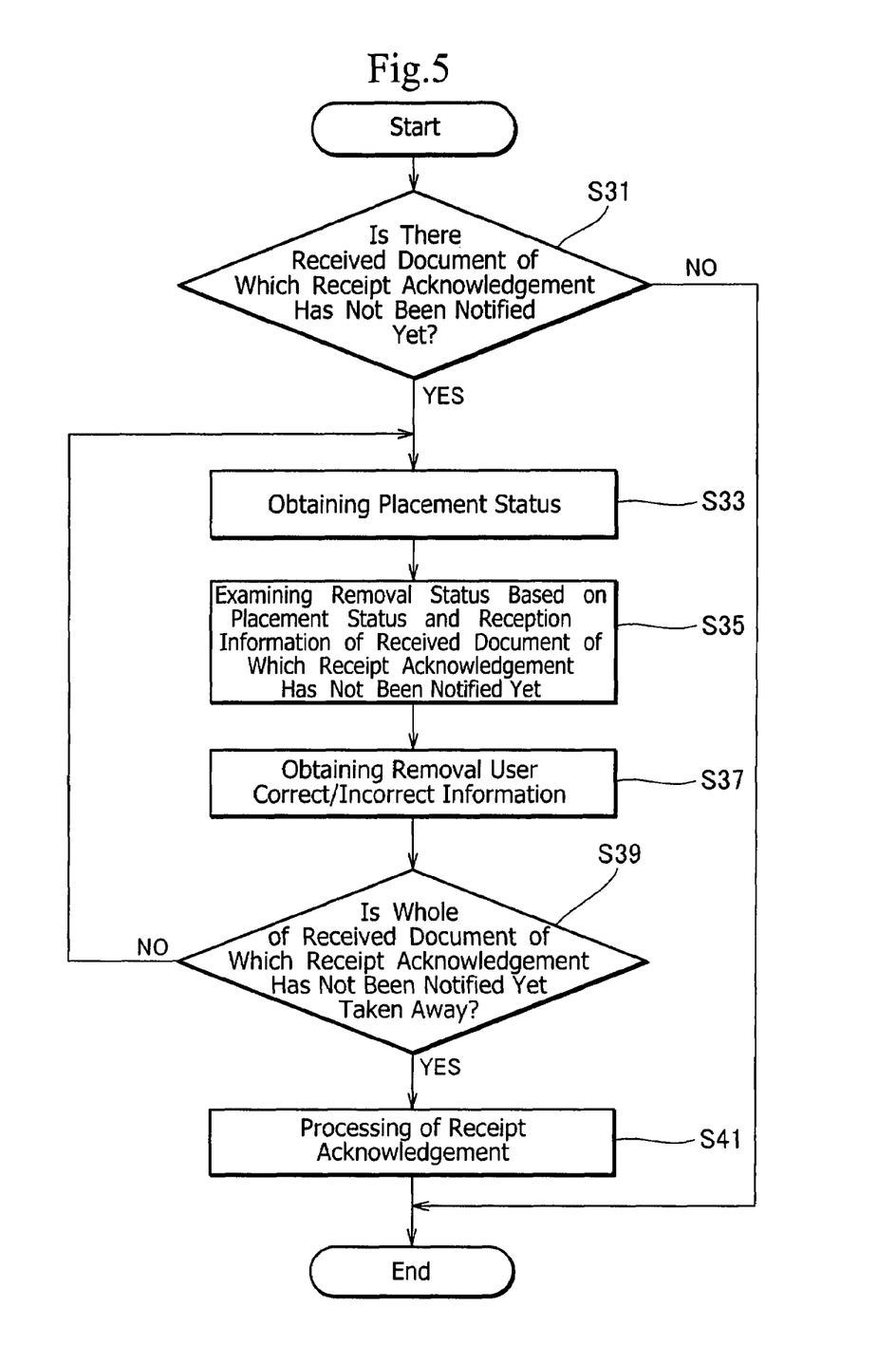
FIG. 5 is an operational flowchart to notify acknowledgement of receipt in accordance with the received document.

Subsequently, in accordance with the flowchart in FIG. 5, is explained a flow of an operation in obtaining a placement status as to which and how much of the received document among received facsimile documents that have been discharged on the discharge tray is left and notifying the source of receipt acknowledgement based on the obtained placement status.

At Step S31, the facsimile controller 3 determines whether there is a communication (a reception information record) in which receipt acknowledgement of the received document has not been notified yet, referring to stored information (the field of 'reception acknowledgement' in FIG. 3A) of the reception information storing section 31. As a result of the determination, the facsimile controller 3 moves the flow of the operation to Step S33 when a determination that there is a communication in which receipt acknowledgement of the received document has not been notified yet. On the other hand, the facsimile controller 3 terminates a series of the flow of operations when a determination that there is no communication in which receipt acknowledgement of the received document has not been notified yet.

In order to obtain a placement status which and how much of the received facsimile documents that have been discharged on the discharge tray are left, the placement status obtaining section 27 makes the paper ID detecting section 13a provided in the discharge section 13 read out recording paper ID of the IC tag 43 of the received document on the discharge tray at Step S33.

At Step S35, the placement status determining section 33 and the removal status determining section 35 examine a placement status as to which and how much of the received documents is left and a removal status as to when and by whom which received document has been taken away with respect to the received facsimile documents placed on the discharge tray by referring to the placement status of the received document obtained by the placement status obtaining section 27 and the field of 'removal date and time' shown in FIG. 3B among the page information subordinate to the reception information of the received document of which receipt acknowledgement has not been notified yet.

When a determination that the placement status of the received document obtained by the placement status obtaining section 27 shifts from presence to absence is made, at Step S37, the removal status determining section 35 regards that a received document specified based on the placement status has been taken away by a user specified based on the user ID obtained by the user ID obtaining section 29 upon determination of the shifting, and presumes a removal user who has taken away the received document. The removal status determining section 35 presumes that a received document specified based on the placement status has been taken away by a user different from a proper destination when a determination that the placement status of the received document obtained by the placement status obtaining section 27 shifts from presence to absence is made and also when a determination that the user specified based on the user ID obtained by the user ID obtaining section 29 upon determination of the shifting does not agree with a user (see the field of 'destination user name' among the reception information shown in FIG. 3A) in destination information based on the stored information of the reception information storing section 31 is made. On the other hand, the removal status determining section 35 presumes that a received document specified based on the placement status has been taken away by a user different from a proper destination when a determination that the user specified based on the user ID obtained by the user ID obtaining section 29 does not agree with a user in the destination information based on the stored information of the reception information storing section 31 is made. That is, the removal status determining section 35 compares the field of 'destination user name' in the reception information as shown in FIG. 3A with the field of 'removal user name' in the page information as shown in FIG. 3B to make a removal user correct/incorrect determination whether the received document has been taken away by a proper destination user correctly. As regarding an access user obtained by the user identification information obtaining section 29 as the removal user having taken away the received document when the placement status of the received document obtained by the placement status obtaining section 27 shifts from presence to absence, the access user name is stored as the removal user in the field of 'removal user name' in the page information shown in FIG. 3B. Accordingly, the access user obtained by the user identification information obtaining section 29 at the time that the removal status of the received document shifts from presence to absence is arranged to be regarded as the removal user having taken away the received document, as referring to 'removal date and time' in the page information shown in FIG. 3B.

At Step S39, the facsimile controller 3 determines whether all pages ('3' pages in the embodiment) have been taken away relative to a communication (a reception information record) in which receipt acknowledgement of the received document has not been notified yet, as referring to the stored information (the field of 'removal date and time' in FIG. 3B) of the reception information storing section 31. As a result of the determination, the facsimile controller 3 moves the flow of the operation return to Step S33 and performs the subsequent operation sequentially when a determination that all of the pages among the communications in which receipt acknowledgement of the received document has not been notified yet are not taken away (there are cases where all of the pages are left in their entirety and where apart of the pages is partly left. Informing modes in those cases will be described later.) is made. On the other hand, the facsimile controller 3 moves the flow of the operation to Step S41 when a determination that all of the pages have been taken away is made.

The facsimile controller 3, at Step S41, informs both or either of the appropriate source and/or the appropriate destination of receipt of the received document via an appropriate means such as facsimile communication or e-mail. At this Step S41, when a determination that the placement status of the received document obtained by the placement status obtaining section 27 shifts from presence to absence is made and also when the determination of the shifting is made about all of the received document included in the facsimile reception specified based on the placement status, the whole of the received document included in the facsimile reception is considered as having been taken away, and receipt of the received document is arranged to be informed to both or either of the appropriate source and/or destination. Further, a result of the removal user correct/incorrect determination at Step S37 may be sent together with the receipt acknowledgement. In addition, in delivering the receipt acknowledgement of the received document to the source of the facsimile via an appropriate means such as facsimile communication or e-mail, a facsimile number or an e-mail address of the appropriate source may be extracted by referring to facsimile numbers and e-mail addresses registered in an address book.

[Disclosure of Variations]

The foregoing embodiment is explained by giving an example that a group of facsimile reception transmitted from a source is considered as a unit and for a document of the facsimile reception, when a determination that the placement status of the received document obtained by the placement status obtaining section 27 shifts from presence to absence is made and also when the determination of the shifting is made about all of the received document included in the facsimile reception specified based on the placement status, the whole of the received document included in the facsimile reception is regarded as having been taken away, and receipt of the received document is informed to both or either of the appropriate source and/or destination. However, the present invention is not limited to the example. More specifically, for a group of a received facsimile document, for example, when a determination that the placement status of the received document obtained by the placement status obtaining section 27 shifts from presence to absence is made and also when the determination of the shifting is made about a part of the received document among all of the received documents included in facsimile reception specified based on the placement status, it may be configured such that the received document included in the facsimile reception is regarded as having been partly taken away and partial receipt of the received document is informed to both or either of the appropriate source and/or destination.

When a determination that the placement status of the received document obtained by the placement status obtaining section 27 does not shift from presence to absence (regardless of the whole or a part of the received document in a group of the facsimile reception) even after a predetermined time has elapsed from the moment the facsimile reception is made, it may be configured such that the received document specified based on the placement status is regarded as being forgotten to be removed and an alarm of forgetting removal of the received document is given to both or either of the appropriate source and/or destination.

Further, it may be configured such that the received document specified based on the placement status is regarded as being forgotten to be removed by a user of destination information (see the field of 'destination user name' in the reception information shown in FIG. 3A) based on the stored information of the reception information storing section 31 and an alarm of forgetting removal of the received document is given to both or either of the appropriate source and/or destination when a determination that the placement status of the received document obtained by the placement status obtaining section 27 does not shift from presence to absence (regardless of the whole or a part of the received document in a group of the facsimile reception) even after a predetermined time has elapsed from the moment the facsimile reception is made.

As a mode of informing both or either of the appropriate source and/or destination of receipt or forgetting removal of the received document, a configuration that an alarm beeping is sounded by the facsimile machine at the destination may be adopted. By reading out user ID of a memory card 16 carried by a user, the receipt or forgetting removal of the received document may be informed at the moment when the appropriate user accesses the facsimile machine. At the time of the informing, the receipt or forgetting removal of the received document may be displayed on a display screen of the display section 8a. In addition, on the occasion of the display, the receipt or forgetting removal of the received document may be displayed, for example, continuously for a predetermined time or temporarily.

Although the foregoing embodiment is explained as providing an example that the user ID obtaining section 29 obtains a user ID which is stored on a memory card (non-contact type memory) 16 carried by a plurality of respective users and is capable of identifying each user uniquely via the memory card (non-contact type memory) 16 every time the user makes access, the present invention is not limited to the example. More specifically, for example, a mode may be adopted that the user ID obtaining section 29 obtains the user ID through a key input operation by the user or biometric information authentication of the user such as a fingerprint authentication every time the user makes access.

A concept of 'to inform of management information of a received facsimile document' in the present invention includes all that when a facsimile is received, that effect is informed to an appropriate destination user via e-mail, etc., when a received facsimile document has been taken away by a proper destination user, that effect is informed to an appropriate source user via e-mail, etc., when a part or the whole of a received facsimile document is not taken away and left behind, that effect is informed to an appropriate source or destination user via e-mail, etc., when a received facsimile document has been taken away by the incorrect user, that effect is informed to an appropriate source user, a proper destination user or the user who has taken away the document by mistake via e-mail, etc.

Last, there are various modes in the aforementioned present invention obviously belonging to the identity scope. Such various modes are not regarded as departing from the spirit and scope of the invention, and every modification obvious to those skilled in the art falls within the technical scope of the claims according to the present invention.

[Effects of the Embodiment]

In the facsimile machine 101 according to the embodiment of the present invention, the received document managing section 37 manages a received facsimile document based on the placement status obtained by the placement status obtaining section 27 and stored information of the reception information storing section 31. Here, 'to manage a received facsimile document' is a concept including all accurately comprehending management information of the received document such as from which source to which destination the received document on the discharge tray is transmitted, when and by whom a part or the whole has been taken away, based on the placement status obtained by the placement status obtaining section 27 and the stored information of the reception information storing section 31 and storing, changing, deleting or updating the comprehended management information of the received document so as to be used for informing the source or destination. Consequently, according to the facsimile machine 101 of the embodiment of the present invention, a received facsimile document which has been transmitted from a source to a destination can be managed properly based on the management information.

Since the management information of the received facsimile document as to from which source to which destination the received document on the discharge tray is transmitted and when and by whom a part or the whole has been taken away is arranged to be informed to both or either of the appropriate source and/or destination, the source is able to know the management information of the received facsimile document in detail while the destination is able to know without fail an existence of the received facsimile document addressed to himself/herself.

What is claimed is:

1. A facsimile machine comprising:
    an image forming section configured to produce a received facsimile document by forming an image of a document, which has been received from a source via a facsimile transmission, on at least one sheet of recording paper;
    a discharge section on which the received facsimile document image-formed by the image forming section is discharged;
    a reception information storing section storing reception information of a received facsimile document, every time a facsimile is received from the source, the reception information being stored in association with recording paper identification information read from a non-contact memory provided on a plurality of respective sheets of the recording paper and which identifies each sheet of the recording paper uniquely;
    a placement status obtaining section provided in the discharge section and configured to obtain a placement status of the received document in the discharge section as being present or absent by reading the recording paper identification information of the non-contact memory; and
    a received document managing section configured to manage the received facsimile document based on the placement status obtained by the placement status obtaining section and stored information of the reception information storing section.

2. The facsimile machine according to claim 1, wherein the received document managing section manages the received facsimile document by determining whether the received facsimile document for which the placement status of present has been made has been removed from the discharge section when a determination is made that the placement status of the received facsimile document obtained by the placement status obtaining section shifts from present to absent.

3. The facsimile machine according to claim 1, wherein the received document managing section manages the received facsimile document by determining that an entirety of the received facsimile document included in the facsimile transmission has been removed from the discharge section when:
    a determination is made that the placement status of the received facsimile document obtained by the placement status obtaining section shifts from present absent; and also
    the determination of the shifting is made for an entirety of the received facsimile document included in the facsimile transmission specified based on the placement status of each of said at least one sheet.

4. The facsimile machine according to claim 1, wherein said at least one sheet is a plurality of sheets and the received document managing section manages the received facsimile document by determining that the received facsimile document included in the facsimile transmission has been partly removed from the discharge section based on when:
- a determination is made that the placement status of a portion of said plurality of sheet of the received facsimile document obtained by the placement status obtaining section shifts from present to absent; and also
- a determination is made that the placement status of another portion of said plurality of sheet of the received facsimile document obtained by the placement status obtaining section remains as present.

5. The facsimile machine according to claim 1, wherein the received document managing section manages the received facsimile document by determining that the received facsimile document specified based on the placement status is forgotten to be removed when a determination is made that the placement status of the received facsimile document obtained by the placement status obtaining section does not shift from present to absent after a predetermined time has elapsed from a time of the facsimile transmission.

6. The facsimile machine according to claim 1, further comprising a user identification information obtaining section configured to obtain user identification information of a user accessing the facsimile machine every time the user makes access, wherein the received document managing section manages the received facsimile document based on the placement status obtained by the placement status obtaining section, the stored information of the reception information storing section and the user identification information obtained by the user identification information obtaining section.

7. The facsimile machine according to claim 6, wherein the received document managing section manages the received facsimile document by determining that the placement status of the received facsimile document obtained by the placement status obtaining section shifts from present to absent, and determining that the received facsimile document has been taken away by a user specified based on the user identification information obtained by the user identification information obtaining section upon determination of the shifting, and storing the user identification information in association with said the reception information of said received facsimile document.

8. The facsimile machine according to claim 6, wherein the received document managing section manages the received facsimile document by determining that the received facsimile document specified based on the placement status has been taken away by a user of a proper destination by determining that:
- the placement status of the received facsimile document obtained by the placement status obtaining section shifts from present to absent; and also
- a user specified based on the user identification information obtained by the user identification information obtaining section upon determination of the shifting of the placement status of the received facsimile document agrees with a user of destination information in the stored information of the reception information storing section.

9. The facsimile machine according to claim 6, wherein the received document managing section manages the received facsimile document by determining that the received facsimile document specified based on the placement status has been taken away by a user different from a user of proper destination by determining that:
- the placement status of the received facsimile document obtained by the placement status obtaining section shifts from present to absent; and also when
- a user specified based on the user identification information obtained by the user identification information obtaining section upon determination of the shifting of the placement status of the received facsimile document does not agree with a user of destination information stored in the stored information of the reception information storing section.

10. The facsimile machine according to claim 6, wherein the received document managing section manages the received facsimile document by determining that the received facsimile document specified based on the placement status is forgotten to be removed by a user of destination information based on the stored information of the reception information storing section when a determination is made that the placement status of the received facsimile document obtained by the placement status obtaining section does not shift from present to absent after a predetermined time has elapsed from a time of the facsimile transmission.

11. The facsimile machine according to claim 1, wherein the received document managing section informs both or either of an appropriate source and/or an appropriate destination of management information of the received facsimile document.

12. The facsimile machine according to claim 11, wherein the management information is informed via facsimile or e-mail.

13. The facsimile machine according to claim 6, wherein the user identification information obtaining section obtains user identification information from a non-contact memory carried by a plurality of respective users and identifies each user uniquely via the non-contact memory carried by the user every time the user makes access the facsimile machine.

14. The facsimile machine according to claim 6, wherein the user identification information obtaining section obtains the user identification information through a key input operation by the user or biometric information authentication of the user every time the user makes access to the facsimile machine.

* * * * *